United States Patent
Kruglick

(10) Patent No.: US 8,289,291 B2
(45) Date of Patent: Oct. 16, 2012

(54) TACTILE DISPLAY CONTROL

(75) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 738 days.

(21) Appl. No.: 12/511,214

(22) Filed: Jul. 29, 2009

(65) Prior Publication Data

US 2011/0025608 A1    Feb. 3, 2011

(51) Int. Cl.
*G06F 3/041* (2006.01)
(52) U.S. Cl. .................................................. 345/173
(58) Field of Classification Search ............... 345/10, 345/24, 27, 173, 619, 670, 671, 698; 340/407.1; 382/312; 434/112, 257, 262
See application file for complete search history.

(56) References Cited

U.S. PATENT DOCUMENTS

| | | | | |
|---|---|---|---|---|
| 7,253,807 B2 * | 8/2007 | Nakajima | ............... | 345/173 |
| 7,800,609 B2 * | 9/2010 | Tarr et al. | ............... | 345/419 |
| 8,059,088 B2 * | 11/2011 | Eid et al. | ............... | 345/156 |
| 8,203,537 B2 * | 6/2012 | Tanabe et al. | ............... | 345/173 |
| 2004/0174392 A1 * | 9/2004 | Bjoernsen et al. | ............... | 345/751 |
| 2005/0179565 A1 * | 8/2005 | Mase et al. | ............... | 341/21 |
| 2009/0109243 A1 * | 4/2009 | Kraft et al. | ............... | 345/660 |
| 2009/0243971 A1 * | 10/2009 | Uehara | ............... | 345/32 |
| 2009/0262074 A1 * | 10/2009 | Nasiri et al. | ............... | 345/158 |
| 2010/0225456 A1 * | 9/2010 | Eldering | ............... | 340/407.2 |
| 2011/0018813 A1 * | 1/2011 | Kruglick | ............... | 345/173 |

* cited by examiner

*Primary Examiner* — Joe H Cheng
(74) *Attorney, Agent, or Firm* — Dorsey & Whitney LLP

(57) ABSTRACT

Examples of methods, systems and computer accessible mediums related to tactile imaging are generally described herein. Some examples may comprise using a receiver to receive information related to a tactile image. Examples may also comprise using a processing arrangement to determine a top hierarchical area of the display corresponding to the image information and/or determining a sub-hierarchical area of the display within the top hierarchical area corresponding to the image information. Some Examples may further comprise using a transmitter to transmit a signal to a tactile display based on the determined sub-hierarchical area for activating a toxel in the determined sub-hierarchical area of the tactile display. Activation of the toxel may comprise activating a plurality of toxels in a determined sub-hierarchical area in response to the transmitted signal. The hierarchical area may include a plurality of sub-hierarchical areas within the top hierarchical area.

20 Claims, 6 Drawing Sheets

TACTILE DISPLAY CONTROL

BACKGROUND

Touch displays are displays that are able to communicate touch sensations. Touch displays and related technology may be used to achieve tele-presence and/or virtual presence. Tele-presence permits a person to feel as though they were present, to give the appearance of being present, or to have an effect, at a location other than the person's actual location. Generally, the touch sense of the user may be provided with appropriate stimuli such that the user is given the feeling of being at another location. Additionally, a user may be provided with the ability to affect the remote location, i.e. the user's position, movements, actions and/or voice may be sensed, transmitted, and duplicated in the remote location to bring about the effect. Tele-presence may allow information to travel in both directions between a user and a remote location. Tele-presence is similar to virtual presence. Tele-presence, however, differs from virtual presence in that tele-presence describes a user interacting with another live, real place, whereas virtual presence provides a user with the experience of interacting with and being immersed in a simulated environment.

Touch technology, including for example, touch displays, tele-presence, virtual presence, and/or touch suits, is still a relatively nascent technology, but may be an efficient added data channel for human perceptions. Touch technologies use infrastructure to generate and convey touch data so that individuals may experience virtual presence or tele-presence in increased fidelity, for example.

BRIEF DESCRIPTION OF THE FIGURES

The foregoing and other features of the present disclosure will become more fully apparent from the following description and appended claims, taken in conjunction with the accompanying drawings. Understanding that these drawings depict only several examples in accordance with the disclosure and are, therefore, not to be considered limiting in scope, the disclosure will be described with additional specificity and detail through the use of the accompanying drawings, in which:

DETAILED DESCRIPTION

Figure 1:
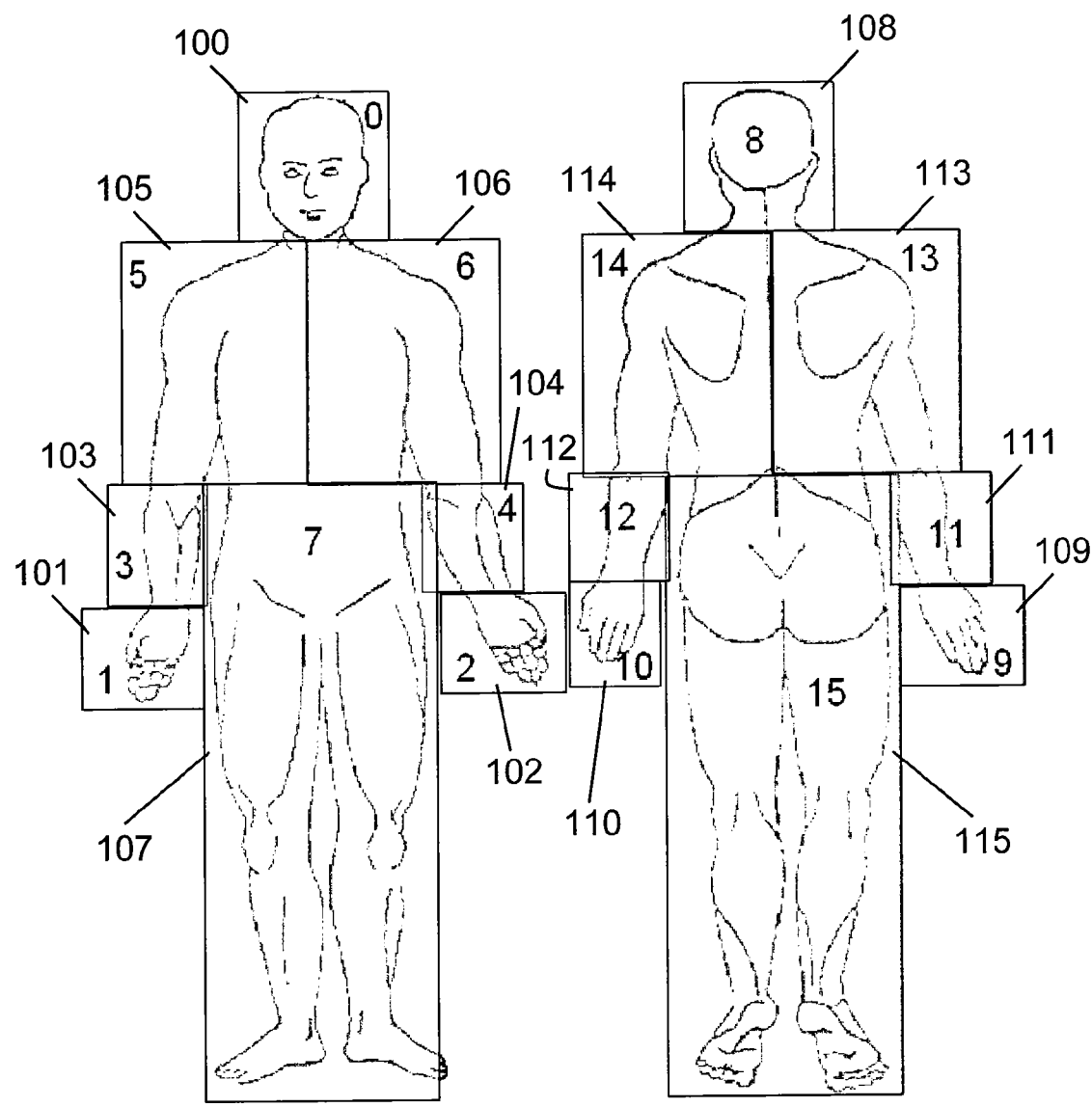
FIG. 1 depicts a first hierarchical area division body map according to certain examples.

In the following detailed description, reference is made to the accompanying drawings, which form a part hereof. In the drawings, similar symbols typically identify similar components, unless context dictates otherwise. The illustrative examples described in the detailed description, drawings, and claims are not meant to be limiting. Other examples may be utilized, and other changes may be made, without departing from the spirit or scope of the subject matter presented herein. It will be readily understood that the aspects of the present disclosure, as generally described herein, and illustrated in the figures, may be arranged, substituted, combined, separated, and designed in a wide variety of different configurations, all of which are explicitly contemplated herein.

The present disclosure is generally drawn to methods, systems, apparatuses, and computer programs related to tactile display control. However, conveying touch data has typically involved a number of difficulties that generally do not exist when dealing with conventional displays. For example, the number of pixels that may be utilized for a tight pitched touch pixel (toxel) grid may be orders of magnitude more than the number of pixels that may be utilized to display an image on a screen.

One attempt to address these difficulties has included, for example, manipulating large areas of pixels instead of focusing on individual pixels. In a virtual gaming environment, for instance, a user may interact with a computerized virtual world through the use of an avatar, which may be a 3-D, 2-D, or other suitable representation of the user in the virtual world. Suppose the user's avatar steps into a pool of water in the computerized world, instead of activating each pixel associated with the user's feet and legs, the sensation may be sent to all pixels, or toxels in the case of touch pixels, below the user's waist. However, this solution is not entirely satisfactory because users exist in many different sizes and shapes, thus making it difficult or impossible to ensure that a pixel with the same numerical address would be at the same location on a different person. For example, a relatively large person may wear a larger touch suit with a greater overall surface contact area, and hence more associated toxels than a relatively small person wearing a relatively smaller touch suit. Accordingly, absolute toxel reference addressing may be less effective and/or entirely ineffective over a variety of uses and/or for a variety of users.

Accordingly, the present disclosure more particularly relates to tactile data conveyance by fractal hierarchy touch mapping. Fractal hierarchy touch mapping, in some examples, may use alternating zone and segment data blocks to define, for example, a body location that may receive a signal. In some examples, the body may be divided into zones. Each zone may be further divided into segments. Each segment may be further divided into sub-zones, and so on. The alternating zone and segment data blocks comprising the fractal hierarchy may allow for the use and compatibility of devices with a variety of resolutions.

A possible method for achieving tele-presence and/or virtual presence may include the use of a touch suit or component (also referred to as a data suit or component) that may be worn by a user. The touch suit may be covered with toxels, or touch pixels, which may be accessed (e.g., read, write, etc.) by a computer. Data may be received from a computer and transmitted to the touch suit permitting a user to experience the sensory experience of a computerized world or remote location, and/or data may be transmitted from the touch suit to a computer to produce a particular result in a computerized world or remote location, for instance.

In accordance with some examples provided herein, higher resolution touch devices, such as touch suits and the like, may proceed through the fractal hierarchy to lower and more detailed levels of the hierarchy than lower resolution devices. Each level in the hierarchy may be associated with smaller amounts of pixels, and correspondingly smaller areas of the body. A lower resolution device may only proceed through the hierarchy as far as, for example, a data block that may define the largest area effected in, for example, a computerized simulated world, such as "everything below the waist." In comparison, a higher resolution device may, or may not, proceed to a more detailed level in the hierarchy, corresponding to smaller and more specific areas of the body, such as the right foot for example, or even the big toe on the right foot.

FIG. 1 depicts a first hierarchical area division body map according to certain examples of the present disclosure. FIG. 1 includes numbering to designate illustrative components of examples shown within the drawings, including the following: hierarchical areas 100-115, including ventral hierarchical areas 100-107 and dorsal hierarchical areas 108-115. A fractal hierarchy touch mapping, which may also be referred to as a hierarchical area division body mapping, in some examples, may use alternating zone and segment data blocks to define, for example, a body location that may receive a signal. In some examples, the body may be divided into hierarchical areas. For example, the body may be divided into first-order hierarchical areas, which may be referred to as zones. Each zone may be further divided into sub-hierarchical areas, which may be referred to as segments. Each segment may be further divided into second-order sub-hierarchical areas referred to as sub-zones, and so on. The alternating zone and segment data blocks comprising the fractal hierarchy, or hierarchical area division, may allow for the use and compatibility of devices with a variety of resolutions, for example. FIG. 1 specifically illustrates a touch suit divided into hierarchical areas. It is to be appreciated that in alternative examples, hierarchical area division may be applied to other touch devices or components.

As illustrated in FIG. 1, for example, the fractal hierarchy approach may divide the body into first order hierarchical areas 100-115. First order hierarchical areas may also be referred to herein as zones. As shown, for example, a first-order division may divide the body into sixteen (16) hierarchical areas or zones. While this example may show a first-order hierarchical division of sixteen (16) zones, any number of zones greater or less than sixteen (16) may be used. Each of the sixteen (16) zones may have a unique identifier, such as a binary number, which may allow a system that may include software and/or hardware, for example, to identify and locate each hierarchical zone. Because there are 16 zones resulting from the first order division in this example, identifying and communicating a determined zone in the hierarchical first-order division, in one encoding example, may use 4 bits, as 4 bits may be used to store numbers 0-15.

In the example of FIG. 1, the ventral (front) zones 100-107 may have unique identifiers 0-8 respectively. Corresponding dorsal (rear) zones 108-115 may each be defined and identified by adding the number 8 to the corresponding zone identifiers for ventral zones 100-107. For example, zone 100 may be identified as "0" and refer to the front of the head. Adding 8 to "0" may provide the identifier for the back of the head 108, which in this case would be "8". Similarly, for example, hierarchical area 101, which may include the front of a user's right hand and have an identifier of "1", may correspond to the hierarchical area or zone that may include the back of the user's right hand 109 and have an identifier of "9" (resulting from adding 1+8).

Data which may affect or have an effect on both sides (e.g., ventral, dorsal) of the same area may be efficiently compressed, because, as may be seen in this example, only one bit flip (for example, 0 to 1) is used to identify a particular ventral area's corresponding dorsal area in a first-order hierarchical division. Other implementations may be used for determining and identifying hierarchical areas or zones. For example, hierarchical areas or zones may be defined and/or determined, for instance, to match the expected frequency of accessing a particular address, or addresses, and areas that may frequently receive the same signal.

In another example, ventral and dorsal zones may be a binary inversion, or compliment, of one another. For instance, a particular ventral zone may be coded as "0111", whereas the corresponding dorsal zone may be coded as "1000". In other examples, any suitable coding scheme may be used.

Fractal hierarchy may allow for less data transfer and energy expenditure to produce a given result. For instance, if a user is wearing a touch suit and navigating a virtual computer world through the use of an avatar, and the avatar walks into waist deep water, the fractal hierarchy may stay at a fairly high-order level, sending an activating signal to a correspondingly large-area of the touch suit to generate a sensation in the user's entire lower body. It is more efficient to only have to reach the level of definition required to define the largest area affected. A large signal of this type may use less data and in some cases, significantly less data, than the millions of data points that may be necessary to activate all of the pixels, or a large number of pixels, in the leg areas one at a time.

In addition to the tactile data of the fractal hierarchy being resolution independent, in some examples, the tactile data may be, or may also be, size independent, whereby the hierarchy may define tactile images by body location and not absolute pixel reference. For example, the hierarchy, which may include levels of zones and segments, may be mapped to specific regions of the body, such as the front of the right leg, as opposed to a pixel being mapped to an absolute address. A pixel mapped to an absolute address may map to a different specific location on the touch suit of different users depending on the user's body size and the size of the user's touch suit.

Additional factors that may alter the placement of a particular pixel's address are the type and/or model of the gear used, and/or the apparatus, or device used, for example, a touch suit, glove(s), head units, or any combination thereof. Accordingly, the hierarchical tactile data format examples presented herein may be resolution and body size and shape independent, as well as highly data efficient for touch-type phenomena and processing. As such, the examples may allow for relatively easy data transmission from, for instance, a computer-based "virtual-world" or simulation without knowing the "real-world" end users' physical measurements and/or the touch equipment the end users may be using, for example.

Examples in accordance with the present disclosure may provide a shape, size, and resolution independent universal data standard for touch data that may be interpreted by whatever tactile gear, device, apparatus, etc., the user may be using. Factors may be taken into account to avoid obsolescence and addressing interoperability, backward compatibility and/or forward compatibility considerations. These factors may include, for example, higher resolution displays accepting lower resolution signals, and lower resolution devices being able to parse later generation data.

Figure 2:
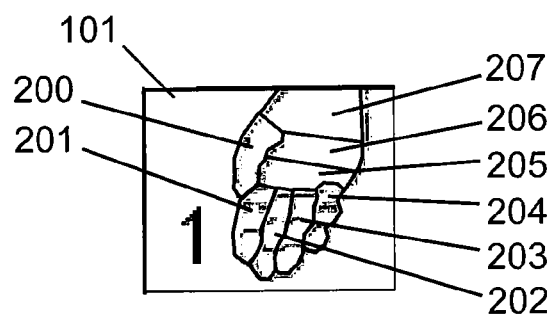
FIG. 2 depicts one of the hierarchical areas depicted in FIG. 1 sub-divided according to certain examples.

FIG. 2 depicts one of the hierarchical areas depicted in FIG. 1 sub-divided according to certain examples of the present disclosure. FIG. 2 includes numbering to designate illustrative components of examples shown within the drawing, including segments/sub-hierarchical areas 200-207. As shown, a hierarchical area may be sub-divided into a plurality of sub-hierarchical areas, which also may be referred to herein as segments. Each zone depicted in FIG. 1 may comprise a number of segments as depicted in FIG. 2. For example, zone 101 of FIG. 1, which corresponds to the front of the user's right hand, is shown in FIG. 2 as being divided into eight segments 200-207. Thus, with corresponding segments defined on the rear of the user's right hand, the user's hand (including, ventral and dorsal portions) may be divided into a total of sixteen segments, for example. Similarly, as described above with respect to FIG. 1, each of the sixteen segments (e.g., segments 200-207 on the front of the user's right hand, and an additional eight segments on the rear) may be identified using 4 bits.

Some body parts, such as the hand, have relatively well defined anatomical areas for sectors or sub-hierarchical areas that may be defined, such as each segment of each finger and sections of the palm. As depicted in FIG. 2, for example, the front of the user's right thumb may be defined to be one sub-hierarchical area or segment 200, with the front of each of the right hand's fingers being defined as sub-hierarchical areas 201, 202, 203, and 204. The user's front palm may be divided into three sub-hierarchical areas or segments 205, 206, and 207 in this example.

For other body parts, such as the abdomen, for example, simple or simple discrete fractional areas such as, for instance, "upper fifth", "second fifth", etc. may be used. Other fractional areas may be used to define segments, including, for example, variable implementations, or fractional areas that may be defined as a function of one or more factors, which may be related to the user and/or the signals that may be expected to be received, for example. If, for instance, a user is playing softball, the pitching arm may be sub-divided into, for instance, 16 areas, but if the user is riding a bike with their arms stationary, the arm may only be sub-divided into eight areas.

Figure 3:
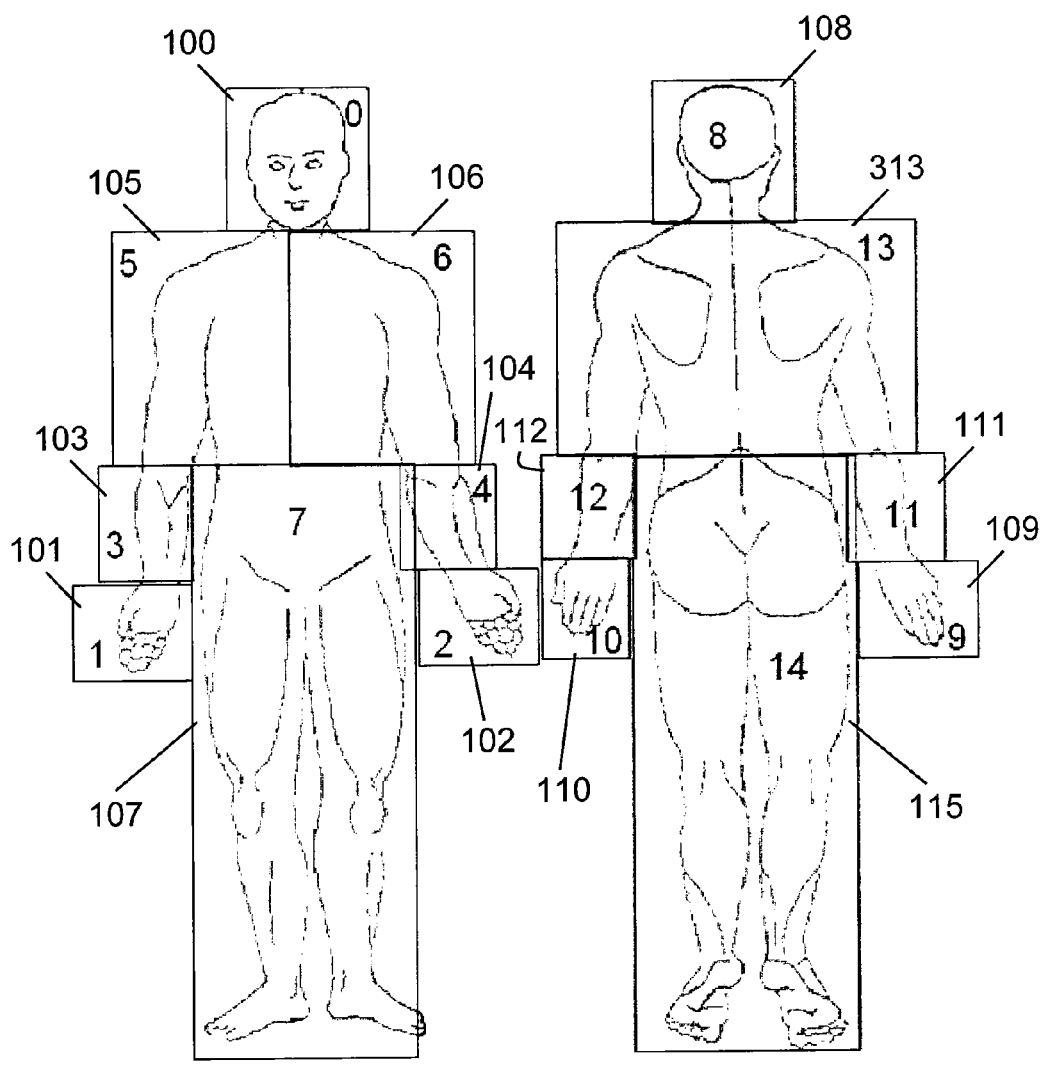
FIG. 3 depicts a second example of a hierarchical area division body map according to certain examples.

FIG. 3 depicts a second hierarchical area division body map according to certain examples of the present disclosure. FIG. 3 includes numbering to designate illustrative components of examples shown within the drawing, including a hierarchical area 313. In some examples, it may be desirable to leave unused one of the, for example, 16 identifiers provided by four bits. Thus, in the example of FIG. 3, the upper back has been divided into one zone 313, whereas, in contrast, the upper back has been divided into two zones 113 and 114 in the example shown in FIG. 1. All of the other hierarchical areas depicted in FIG. 3 may be the same as they are depicted in FIG. 1. By leaving one of the 16 identifiers unused, an occurrence of the unused value may indicate the end of the location data, which in this example may indicate, for instance, the whole body. Generally, the unused value may be used to communicate additional information. For example, a usage of this signal may include sending a binary "1111" followed by a "no sensation" tag and/or instruction to clear all inputs on a tactile suit, for example.

Examples of fractal hierarchy touch mapping may result in toxel and/or pixel information frames of varying length. Certain data formats may not utilize data end-indicators for tactile image messages of varying length. Other data formats, however, may utilize an end-of-sequence signal. As an end-of-sequence signal, a zone or segment (including sub-segments and sub-zones) may be defined that signals a null and indicates that the previous value (e.g., zone or segment, including sub-zones and sub-segments) was the end of the data, for example.

The touch mapping hierarchy may be divided even further than the first-order hierarchical zone division and the sub-hierarchical segment divisions discussed thus far. For instance, there may further be a plurality of sub-zones/second-order sub-hierarchical areas within each segment/sub-hierarchical area. And within each of the sub-zones/second-order sub-hierarchical areas, there may further be a plurality of sub-segments/third-order sub-hierarchical areas. This example hierarchy may be implemented and/or utilized recursively until a level of specification is reached that may be adequate for a single toxel and/or a predefined number of toxels on any format to be identified, for example.

Providing a hierarchy of sub-divisions of the body, for example, may provide for compatibility and operability of devices with varying levels of resolution. For instance, if a device only supports a relatively low level of resolution, the signals may remain at a rather high level of the hierarchy, whereas devices supporting a higher level of resolution may reach lower levels of the hierarchy. Lower levels of the hierarchy may correspond to greater specificity resulting from the additional levels of recursive divisions. For example, a higher level may identify the ventral surface of the right hand, but a lower level may identify the fingernail of the thumb on the right hand.

Figure 4:
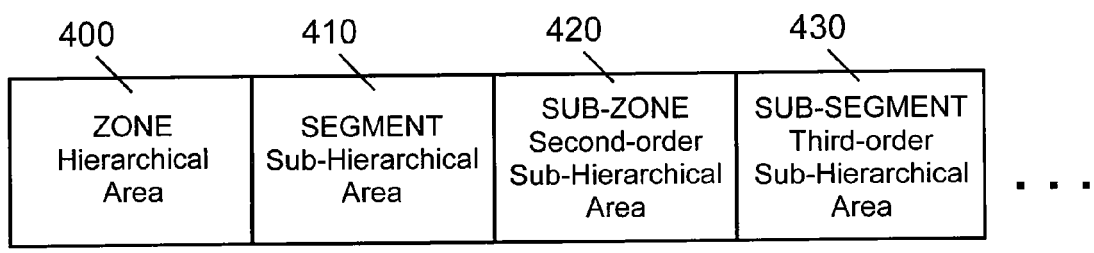
FIG. 4 depicts the recursive nature of hierarchical touch mapping according to certain examples.

FIG. 4 depicts the recursive nature of hierarchical touch mapping according to certain examples of the present disclosure. FIG. 4 includes numbering to designate illustrative components of examples shown within the drawing, including the following: hierarchical areas/zones 400; sub-hierarchical areas/segments 410; sub-zones/second-order sub-hierarchical areas 420; and sub-segments/third-order sub-hierarchical areas 430. Zones 400 may be followed by one or more determined segments 410 to which a signal for activating a toxel may be transmitted. Segments 410 may be followed by one or more determined sub-zones 420 to which a signal for activating a toxel may be transmitted. Sub-zones 420 may in turn be followed by one or more determined sub-segments 430 to which a signal for activating a toxel may be transmitted. As depicted in FIG. 4, this example may continue in this recursive hierarchical nature until a level of specification is reached that may be adequate and/or appropriate.

As the resolution may reach potentially undifferentiated areas such as, e.g., small surfaces of finger segments or small patches of skin on a thigh or abdomen, a fractal approach may be used where the zone and segment data follow geometric progressions to define a detailed point to which a signal may be transmitted, for example. A device with insufficient resolution may stop interpreting a data frame when it reaches its own display limit, upon which it may activate the smallest toxel corresponding to the transmitted signal. Accordingly, this example may address interoperability, backward compatibility and/or forward compatibility considerations. It may also provide for users of varying shapes, sizes and/or dimensions to register and/or feel at the same location a touch that may be associated with a signal, for example.

Low resolution data (e.g., one toxel per cm) may utilize less data using an example of fractal hierarchy touch mapping, yet may still be compatible with and displayed on a higher resolution tactile suit as the coordinates may be based on structure and body parts and not numeric toxel addressing. Large area sensations (e.g., tapping on the back of a hand) may utilize less data than smaller area sensations when using an example of fractal hierarchy touch mapping. In contrast to the efficiency that may be gained by using fractal hierarchy touch mapping, sending data to each individual toxel may result in increased bandwidth requirements (e.g., a thousand fold).

In addition, logical functions, such as, for example, Boolean operands, may be used to activate specific toxels. For example, two signals may instruct a sensation on the whole right hand but NOT on the right thumb. Using an example of fractal hierarchy touch mapping, this may be accomplished using only two data blocks, wherein a data block may be used to generally refer to any type of hierarchical area, for instance a zone, a segment, a sub-zone, etc. For example, referring to FIGS. 1-3, one data block may be used to specify the right hand 101 and the sensation, while another data block may be used to indicate that the right thumb 200 may NOT receive the sensation and/or may receive no sensation. Examples of fractal hierarchy touch mapping may result in complex tactile images with relatively low data bandwidth levels by utilizing the nature of touch sensation. Most touches may be perceived as area events as opposed to detailed bit-maps. Accordingly, signaling only one data block that may activate an entire hand, for instance, is much more efficient than signaling thousands of individual pixels, each of which may be defined at a particular address, to activate an entire hand.

Figure 5:
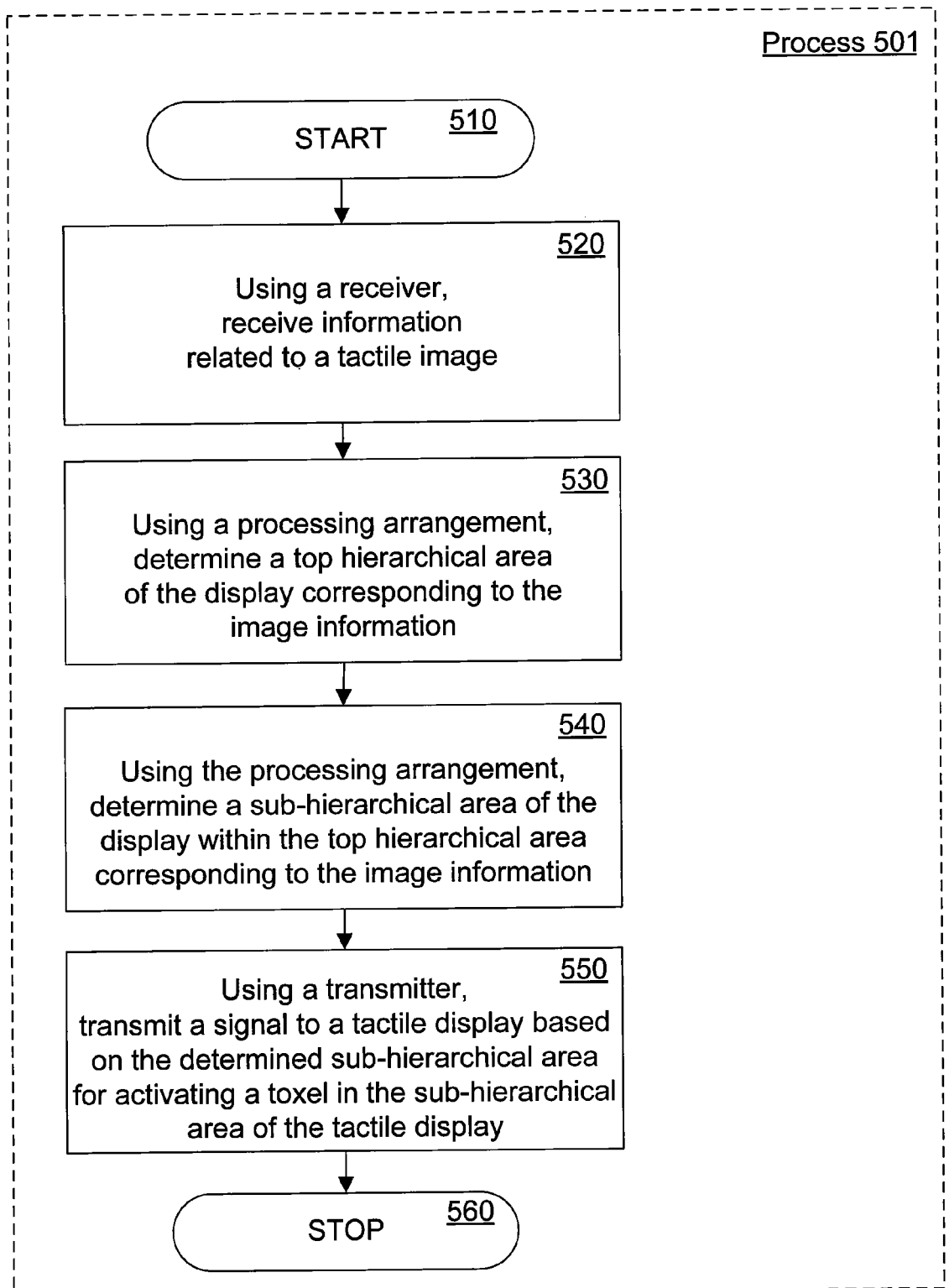
FIG. 5 is a flow diagram of an example procedure for fractal hierarchy touch mapping.

FIG. 5 is a flow diagram of an example procedure for fractal hierarchy touch mapping in accordance with at least some examples of the present disclosure. FIG. 5 includes the following numbering to refer to operations of the example procedure, including process 501. Process 501 may include one or more operations such as: operation 510 (start); operation 520 (using a receiver, receive information related to a tactile image); operation 530 (using a processing arrangement, determine a top hierarchical area of the display corresponding to the image information); operation 540 (using the processing arrangement, determine a sub-hierarchical area of the display within the top hierarchical area corresponding to the image information); operation 550 (using a transmitter, transmit a signal to a tactile display based on the determined sub-hierarchical area for activating a toxel in the sub-hierarchical area of the tactile display); and/or operation 560 (stop). As illustrated, the example procedure may be implemented in and/or by a process 501. Starting at operation 510, processing may continue to operation 520. At operation 520, the process 501 may be arranged to receive information related to a tactile image via a receiver. It will be recognized that the receiver may be a separate component from the processor, or it may be integral with the processor. The example procedure may then proceed to operation 530, where the process 501 may be arranged to determine a top hierarchical area of the display corresponding to the image information. The example procedure may then proceed to operation 540, where the process 501 may be arranged to determine a sub-hierarchical area of the display within the top hierarchical area corresponding to the image information. At operation 550, the example procedure may use a transmitter to transmit a signal to a tactile display based on the determined sub-hierarchical area for activating a toxel in the sub-hierarchical area of the tactile display. It will be recognized that the transmitter may be a separate component from the processor, or it may be integral with the processor. The example procedure may then stop at operation 560.

Figure 6:
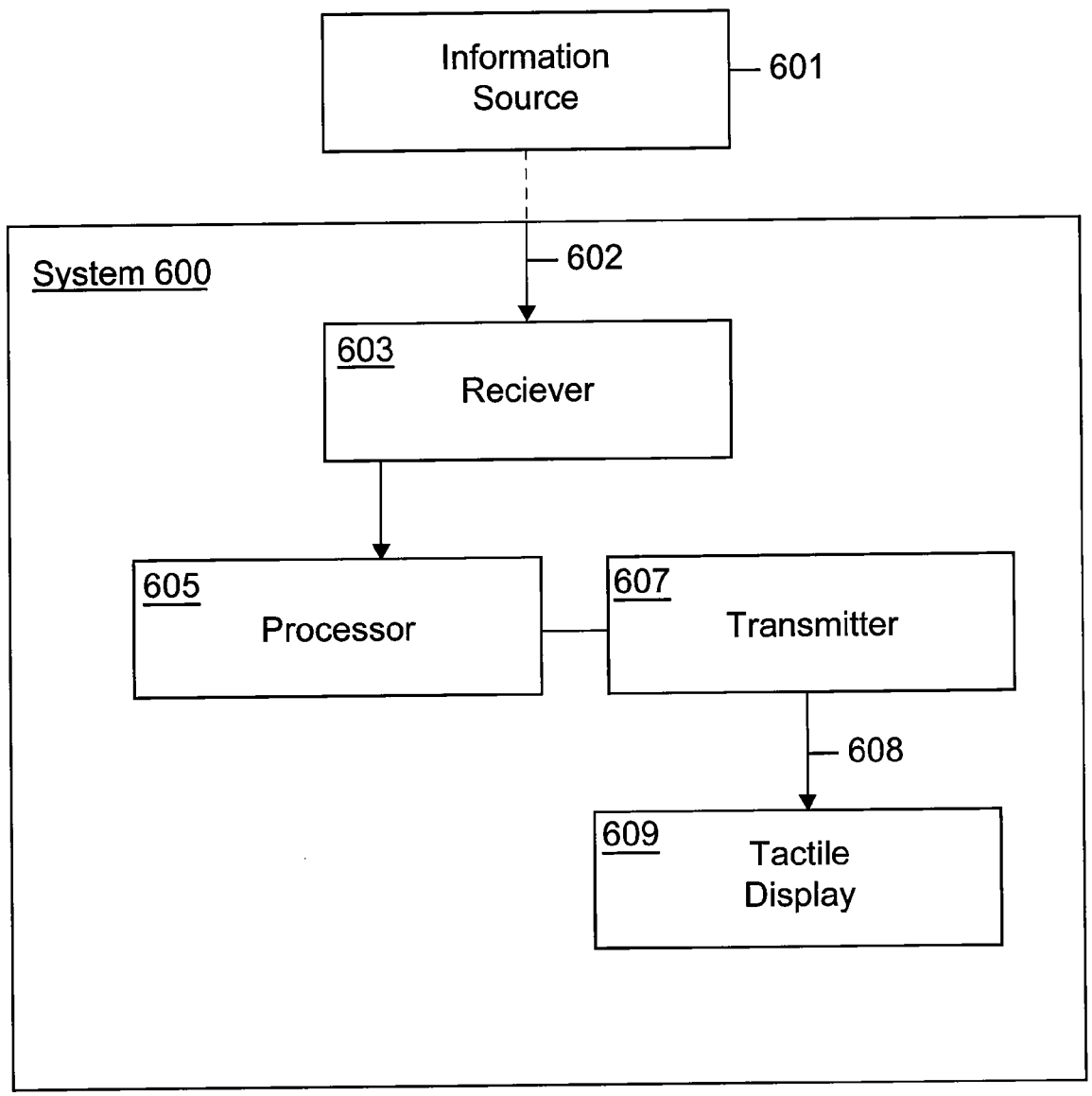
FIG. 6 is a block diagram of an example system configured to be suitable for fractal hierarchy touch mapping.

FIG. 6 is a block diagram of an example system 600 configured to be suitable for fractal hierarchy touch mapping in accordance with at least some examples of the present disclosure. FIG. 6 includes numbering to designate illustrative components of examples shown within the drawing, including a system 600; an information source 601; information 602; a receiver 603; a transmitter 607; a signal 608; and a tactile display 609. In some examples, an information source 601 such as a computer, or any other digital medium capable of transmitting a digital signal, may transmit information 602 to be received by example system 600. An information source receiver 603 may be configured to receive information 602. Receiver 603 may be further configured to communicate with a processor 605, which may be configured to perform process 501 of FIG. 5, for example. System 600 may further include a transmitter 607, which may be configured to communicate with processor 605 and also may be configured to transmit a signal 608 and/or other information to a tactile display 609. As noted above with regard to FIG. 5, the receiver and/or the transmitter may be separate stand alone components or they may be integral with the processor and/or the information source and/or the tactile display.

While FIG. 6 illustrates an information path from information source to receiver to processor to transmitter to tactile display, in other examples the system may be configured such that information flows in the reverse order, i.e. from tactile display to information source. In still other examples, the system may be configured to permit information flow in both directions.

Figure 7:
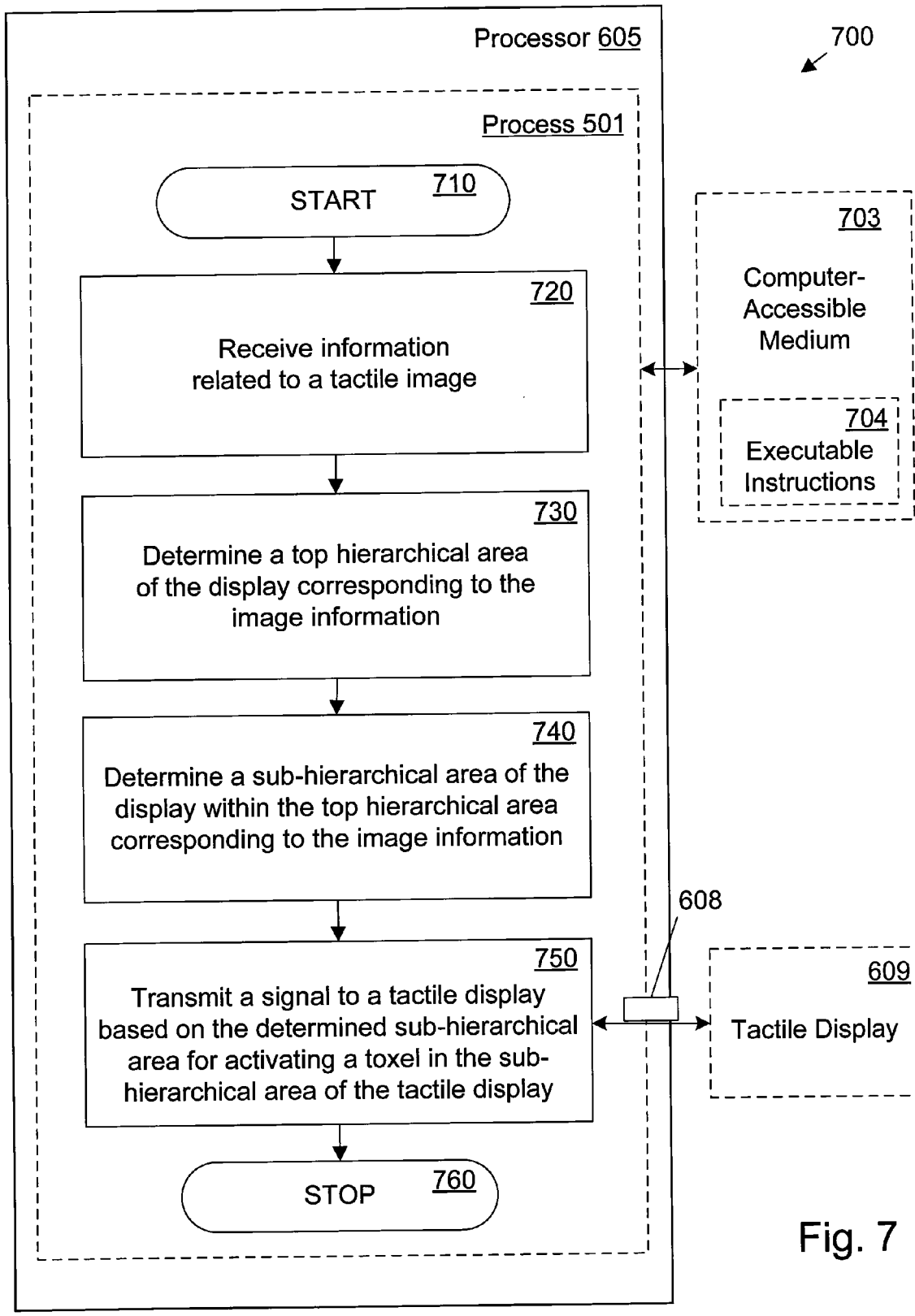
FIG. 7 is a block diagram of an example system configured to be suitable for fractal hierarchy touch mapping.

FIG. 7 is a block diagram of an example system configured to be suitable for fractal hierarchy touch mapping, in accordance with at least some examples of the present disclosure. FIG. 7 includes numbering to designate illustrative components of examples shown within the drawings, including: a system 700; computer-accessible medium 703; executable instructions 704; processor 605; operation 710 (start); operation 720 (receive information related to a tactile image); operation 730 (determine a top hierarchical area of the display corresponding to the image information); operation 740 (determine a sub-hierarchical area of a tactile display within the top hierarchical area corresponding to the image information); operation 750 (transmit a signal to a tactile display based on the determined sub-hierarchical area for activating a toxel in the sub-hierarchical area of the tactile display); operation 760 (stop). As illustrated in FIG. 7, system 700 may include computer-accessible medium 703, which may contain executable instructions 704 stored thereon. When a processor, such as processor 605, executes the executable instructions 704, processor 605 may be configured to receive information related to a tactile image at operation 720. The example arrangement may configure processor 605 to determine a top hierarchical area of the display corresponding to the image information at operation 730. Processor 605 may further be configured to determine a sub-hierarchical area of a tactile display 609 within the top hierarchical area corresponding to the image information at operation 740. The processor 605 may further still be configured to transmit signal 608, for example, to tactile display 609 based on the determined sub-hierarchical area for activating a toxel in the sub-hierarchical area of the tactile display 609 at operation 750.

Figure 8:
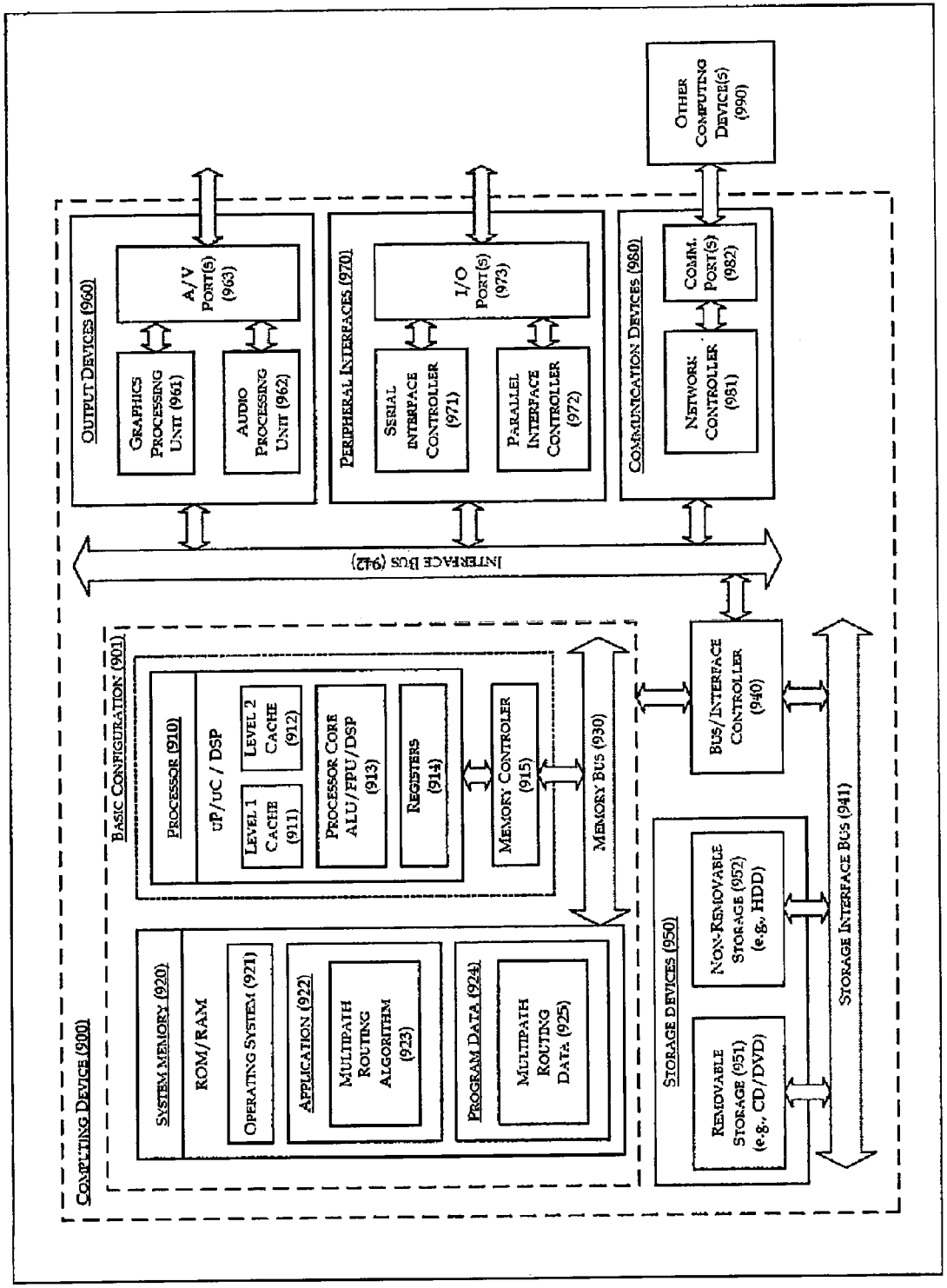
FIG. 8 is a block diagram of a computing device in which fractal hierarchy touch mapping may be utilized according to certain examples, all arranged in accordance with the present disclosure.

FIG. 8 is a block diagram of a computing device in which fractal hierarchy touch mapping may be utilized according to certain examples of the present disclosure. FIG. 8 includes numbering to designate illustrative components of examples shown within the drawings, including; a computing device 900; a basic configuration 901; a processor 910; a level one cache 911; a level two cache 912; a processor core 913; registers 914; a memory controller 915; a system memory 920; an operating system 921; an application 922; an fractal hierarchy algorithm 923; program data 924; fractal hierarchy information 925; a memory bus 930; a bus/interface controller 940; a storage interface bus 941; an interface bus 942; a data storage device 950; a removable storage device 951; a non-removable storage device 952; an output device 960; a graphics processing unit 961; an audio processing unit 962; an A/V (audio-visual) port 963; peripheral interfaces 970; a serial interface controller 971; a parallel interface controller 972; I/O (input/output) ports 973; a communication device 980; a network controller 981; a communication port 982; and computing devices 990.

Generally, example system 600 described in relation to FIGS. 6 and 7, for example, may be integrated within a computing device or environment. FIG. 8 generally illustrates a block diagram of a suitable computing device 900 in which fractal hierarchy touch mapping may be implemented. In a basic configuration 901, the computing device 900 may typically include one or more processors 910 (such as processing arrangement 501) and system memory 920. A memory bus 930 may be used for communicating between the processor 910 and the system memory 920.

Depending on the desired configuration, the processor 910 may be of any type including but not limited to a microprocessor (µP), a microcontroller (µC), a digital signal processor (DSP), an ARM968 processor, other processor with suitable functionality and capabilities, or any combination thereof. The processor 910 may include one more levels of caching, such as a level one cache 911 and a level two cache 912, a processor core 913, and registers 914. The processor core 913 may include an arithmetic logic unit (ALU), a floating point unit (FPU), a digital signal processing core (DSP Core), or any combination thereof. A memory controller 915 may also be used with the processor 910, or in some implementations the memory controller 915 may be an internal part of the processor 910. In some examples, processor and peripherals may be integrated into a single application specific integrated circuit (ASIC).

Depending on the desired configuration, the system memory 920 may be of any type including but not limited to volatile memory (such as RAM), non-volatile memory (such as ROM, flash memory, etc.) or any combination thereof. System memory 920 may typically include an operating system 921, one or more applications 922, and program data 924. Application 922 may include a fractal hierarchy algorithm 923 that is arranged to process information for fractal hierarchy touch mapping. Fractal Program data 925 may include, for example, fractal hierarchy information 925, from which an area for display may be determined. In some examples, application 922 may be arranged to operate with program data 924 on an operating system 921 such that area for display may be determined. This described basic example configuration is illustrated in FIG. 8 by those components within dashed line 901.

The computing device 900 may have additional features or functionality, and additional interfaces to facilitate communications between the example basic configuration 901 and any devices and interfaces. For example, a bus/interface controller 940 may be used to facilitate communications between the example basic configuration 901 and one or more data storage devices 950 via a storage interface bus 941. The data storage devices 950 may be removable storage devices 951, non-removable storage devices 952, or a combination thereof. Examples of removable storage and non-removable storage devices include, e.g., magnetic disk devices such as flexible disk drives and hard-disk drives (HDD), optical disk drives such as compact disk (CD) drives or digital versatile disk (DVD) drives, solid state drives (SSD), and tape drives. Example computer storage media may include volatile and nonvolatile, removable and non-removable media implemented in any method or technology for storage of information, such as, e.g., computer readable instructions, data structures, program modules, or other data.

System memory 920, removable storage 951 and non-removable storage 952 are examples of computer storage media. Computer storage media may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 900. Any such computer storage media may be part of device 900.

The computing device 900 may also include an interface bus 942 for facilitating communication from various interface devices (e.g., output interfaces, peripheral interfaces, and communication interfaces) to the basic configuration 901 via the bus/interface controller 940. Example output devices 960 may include a graphics processing unit 961 and an audio processing unit 962, which may be configured to communicate to various external devices such as a display or speakers via one or more A/V ports 963. Example peripheral interfaces 970 include a serial interface controller 971 or a parallel interface controller 972, which may be configured to communicate with external devices such as input devices (e.g., keyboard, mouse, pen, voice input device, touch input device, etc.) or other peripheral devices (e.g., printer, scanner, etc.) via one or more I/O ports 973.

An example communication device 980 may include a network controller 981, which may be arranged to facilitate communications with one or more other computing devices 990 over a network communication via one or more communication ports 982. The communication connection is one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media and/or computer-accessible medium as used herein may include, e.g., both storage media and communication media, for example.

The computing device 900 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 900 may also be implemented as a personal computer including both laptop computer and non-laptop computer configurations. The computing device 900 may also be implemented as an interactive system such as an information kiosk, television, or a gaming device.

Provided and described herein, for example, are example implementations of various methods arranged in accordance with the present disclosure, which may comprise using a receiver to receive information related to a tactile image. Some example methods may also comprise using a processor to, determine a top hierarchical area of the display corresponding to the image information and/or using a processor to determine a sub-hierarchical area of the display within the top hierarchical area corresponding to the image information. Example methods may also comprise, for example, using a transmitter to transmit a signal to a tactile display based on the determined sub-hierarchical area to activate a toxel in the determined sub-hierarchical area of the tactile display.

Activation of the toxel may comprise activating a plurality of toxels in the determined sub-hierarchical area in response to the transmitted signal. The hierarchical area may include a plurality of sub-hierarchical areas within the top hierarchical area.

Example methods may further comprise using the processor to determine increasingly smaller hierarchical areas until a largest area of the body that includes the location to receive the signal is determined. The hierarchical areas may be defined by zones that may include discrete body parts and/or segments of the body parts, for example. The processor may also be configured to use alternating zone and segment data blocks, for example, to determine the location to receive the signal. The zones may be defined to match areas of the body that may be expected to receive the same signal frequently relative to other areas of the body. Determining a sub-hierarchical area of the display corresponding to the image information may comprise using a logical function including an operand of NOT. It will be understood that the method includes examples where the processor performs process 501, for example, at any location, whether remote, local, or a combination thereof. For instance, the process 501 may be performed remotely in some embodiments whereby the fractal hierarchy touch mapping process may be performed remotely with the information being transmitted to the local tactile display, which may or may not be in the same location as the remote location. Alternatively, the process 501, for example, may be performed by a processor included in the tactile display user's system. Additionally, both the remote and local systems may include processors that may perform process 501, for example.

Also provided and described herein are examples of systems arranged in accordance with the present disclosure for tactile data conveyance of fractal hierarchy touch mapping information. Example systems may comprise a receiver configured to receive information related to a tactile image. Example systems may also comprise a processor configured to determine a top hierarchical area of the display corresponding to the image information and/or determine a sub-hierarchical area of the display within the top hierarchical area corresponding to the image information. Some example systems may also comprise a transmitter configured to transmit a signal to a tactile display based on the determined sub-hierarchical area for activating a toxel in the sub-hierarchical area of the tactile display.

It will be understood that the system includes examples where the processor performs process 501, for example, at any location, whether remote, local, or a combination thereof. For instance, the process 501 may be performed remotely in some examples whereby the fractal hierarchy touch mapping process may be performed remotely with the information being transmitted to the local tactile display, which may or may not be in the same location as the remote location. Alternatively, the process 501, for example, may be performed by a processor included in the tactile display user's system. Additionally, both the remote and local systems may include processors that may perform process 501, for example.

Activation of the toxel may comprise activating a plurality of toxels in the sub-hierarchical area in response to the transmitted signal. The top hierarchical areas may include a plurality of sub-hierarchical areas within the top hierarchical area.

Example systems may further comprise using the processor arrangement to determine increasingly smaller hierarchical areas until a largest area of the body that includes the location to receive the signal is determined. The hierarchical areas may be defined by zones including discrete body parts and/or segments of the body parts. The processor may also be configured to use alternating zones and segment data blocks to determine the location to receive the signal, for example. The zones may be defined to match areas of the body that may be expected to receive the same signal frequently relative to other areas of the body.

Also provided and described herein are example implementations of a computer-accessible medium containing executable instructions thereon, wherein a processor may be adapted to execute the instructions such that the processor may be configured to receive information related to a tactile image, determine a top hierarchical area of the display corresponding to the image information, determine a sub-hierarchical area of the display within the top hierarchical area corresponding to the image information, and transmit a signal to a tactile display based on the determined sub-hierarchical area for activating a toxel in the sub-hierarchical area of the tactile display.

Activation of the toxel may comprise activating a plurality of toxels in the sub-hierarchical area in response to the transmitted signal. The top hierarchical areas may include a plurality of sub-hierarchical areas within the top hierarchical area.

Example computer-accessible mediums may further comprise using the processor to determine increasingly smaller hierarchical areas until a largest area of the body that includes the location to receive the signal is determined. The hierarchical areas may be defined by zones including discrete body parts and/or segments of the body parts, for example. The zones may be defined to match areas of the body that may be expected to receive the same signal frequently relative to other areas of the body. The processor may be configured to use alternating zones and segment data blocks to determine the location to receive the signal.

Touch technology, including for example, touch displays, tele-presence, virtual presence, and/or touch suits, may be generally advantageously utilized in a number of areas and applications. For instance, touch technology may be useful in underwater work, hazardous environments, pipeline inspection, medicine, remote surgery, education, robotics, design, advertising and sales, entertainment, tele-presence art, artificial intelligence, gaming, therapy, training, and connecting communities, for example. The touch technologies, including fractal hierarchy touch mapping of the present disclosure may be used to achieve tele-presence and/or virtual presence for use in, but not limited to, any of the areas or applications noted above.

The present disclosure is not to be limited in terms of the particular examples described in this application, which are intended as illustrations of various aspects. Many modifications and variations may be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which may, of course, vary. It is also to be understood that the terminology used herein is for the purpose of describing particular examples only, and is not intended to be limiting.

There is little distinction left between hardware and software implementations of aspects of systems; the use of hardware or software is generally (but not always, in that in certain contexts the choice between hardware and software may become significant) a design choice representing cost vs.

efficiency tradeoffs. There are various vehicles by which processes and/or systems and/or other technologies described herein may be effected (e.g., hardware, software, and/or firmware), and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various examples of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one example, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the examples disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative example of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range may be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like include the number recited and refer to ranges which may be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

What is claimed is:

1. A method for controlling a tactile display, comprising:
   receiving image information, with a receiver, related to a tactile image;
   determining, with a processor, a top hierarchical area of the display corresponding to the image information;
   determining, with the processor, a sub-hierarchical area of the display within the top hierarchical area corresponding to the image information; and
   transmitting a signal, with a transmitter, to a tactile display based on the determined sub-hierarchical area, wherein the tactile display is adapted to activate a toxel in the sub-hierarchical area of the tactile display in response to the transmitted signal.

2. The method of claim 1, wherein a plurality of toxels in the sub-hierarchical area of the tactile display are activated in response to the transmitted signal.

3. The method of claim 1, wherein the top hierarchical areas include a plurality of sub-hierarchical areas within the top hierarchical area.

4. The method of claim 3, further comprising determining, with the processor, increasingly smaller hierarchical areas until a largest area of the body that includes a location to receive the signal is determined.

5. The method of claim 1, wherein the hierarchical areas are defined by zones including one or more of discrete body parts and/or a portion of the body parts and wherein the sub-hierarchical areas are defined by segments including a sub-portion of the discrete body parts and/or the portion of body parts.

6. The method of claim 5, further comprising alternating zones and segment data blocks, with the processor, to determine the location to receive the signal.

7. The method of claim 5, wherein zone data blocks are defined to match areas of the body that are expected to receive the same signal frequently relative to other areas of the body.

8. The method of claim 1, wherein determining a sub-hierarchical area of the display corresponding to the image information comprises using at least one logical function.

9. A system for tactile data conveyance of fractal hierarchy touch mapping information, comprising:
   a receiver configured to receive image information related to a tactile image;
   a processor configured to:
      determine a top hierarchical area of the display corresponding to the image information, and
      determine a sub-hierarchical area of the display within the top hierarchical area corresponding to the image information; and
   a transmitter configured to transmit a signal to a tactile display based on the determined sub-hierarchical area to activate a toxel in the sub-hierarchical area of the tactile display.

10. The system of claim 9, wherein the transmitter is further configured to activate a plurality of toxels in the sub-hierarchical area in response to the transmitted signal.

11. The system of claim 9, wherein the top hierarchical areas include a plurality of sub-hierarchical areas within the top hierarchical area.

12. The system of claim 11, wherein the processor is further configured to determine increasingly smaller hierarchical areas until a largest area of the body that includes the location to receive the signal is determined.

13. The system of claim 9, wherein the hierarchical areas are defined by zones including one or more of discrete body parts and/or a portion of the body parts and wherein the sub-hierarchical areas are defined by segments including a sub-portion of the discrete body parts and/or the portion of body parts.

14. The system of claim 13, wherein the processor is further configured to use alternating zone data blocks and segment data blocks to determine the location to receive the signal.

15. A computer-accessible medium containing executable instructions thereon, wherein when a processor executes the instructions, the processor is configured to:
   receive image information related to a tactile image;
   determine a top hierarchical area of the display corresponding to the image information;
   determine a sub-hierarchical area of the display within the top hierarchical area corresponding to the image information; and
   transmit a signal to a tactile display based on the determined sub-hierarchical area, wherein the transmitted signal is arranged to activate a toxel in the sub-hierarchical area of the tactile display.

16. The computer-accessible medium of claim 15, wherein a plurality of toxels in the sub-hierarchical area in response to the transmitted signal.

17. The computer-accessible medium of claim 15, wherein the top hierarchical areas include a plurality of sub-hierarchical areas within the top hierarchical area.

18. The computer-accessible medium of claim 17, further comprising, using the processing arrangement, determining increasingly smaller hierarchical areas until a largest area of the body that includes the location to receive the signal is determined.

19. The computer-accessible medium of claim 18, wherein when the processor executes the instructions, the processor is configured to use alternating zone and segment data blocks to determine the location to receive the signal.

20. The computer-accessible medium of claim 15, wherein the hierarchical areas are defined by zones including one or more of discrete body parts and/or a portion of the body parts, wherein the sub-hierarchical areas are defined by segments including a sub-portion of the discrete body parts and/or the portion of body parts, and wherein the zones are defined to match areas of the body that are expected to receive the same signal frequently relative to other areas of the body.

* * * * *